US009259769B1

(12) United States Patent
Kane et al.

(10) Patent No.: US 9,259,769 B1
(45) Date of Patent: Feb. 16, 2016

(54) APPARATUS AND METHOD FOR COLLECTION AND DISPOSAL OF CLEANING WASTE-WATER AND DEBRIS FROM AIR CONDITIONERS

(71) Applicants: Timothy Kane, Stamford, CT (US); Michael Hardy, Stamford, CT (US); Scott C. Cackowski, Stamford, CO (US)

(72) Inventors: Timothy Kane, Stamford, CT (US); Michael Hardy, Stamford, CT (US); Scott C. Cackowski, Stamford, CO (US)

( * ) Notice: Subject to any disclaimer, the term of this patent is extended or adjusted under 35 U.S.C. 154(b) by 0 days.

(21) Appl. No.: 14/690,414

(22) Filed: Apr. 18, 2015

(51) Int. Cl.
B08B 13/00 (2006.01)
F28G 13/00 (2006.01)
F28G 15/00 (2006.01)

(52) U.S. Cl.
CPC ............ *B08B 13/00* (2013.01); *F28G 13/00* (2013.01); *F28G 15/00* (2013.01)

(58) Field of Classification Search
CPC ......... B08B 13/00; B08B 17/00; F28G 13/00; F28G 15/00
See application file for complete search history.

(56) References Cited

U.S. PATENT DOCUMENTS 6,863,116 B1    3/2005    Kane et al.

OTHER PUBLICATIONS

Desolv cleaning kit. http://rectorseal.com/web-media/Desolv-Kit-Instructions.pdf and http://www.rectorseal.com/index.php/rectorseals-desolv-cleaning-kit-time-saving-property-protecting-mini-split-evaporator-cleaning-tool/. Oct. 31, 2014.*
Airconcare website; AIRCONcare air conditioner cleaning kit, found at: http://airconcare,com/collections/products/products/air-conditioner-servicing-kit Australia.
Aqua QB Products website; Aqua QB bag, found at: http://www.aquaqb.com.au Australia.
Hydrokleen website; Image Gallery, found at: http://hydrokleen.com.au/media-gallery/ Australia.
Speedclean website; CoilJetR CJ-125 HVAC Coil Cleaner System, found at: http://www.speedclean.com/coiljet/default.aspx USA.
Goodway Technologies website; CC-JR CoilPro HVAC Coil Cleaning Equipment, found at: http://www.goodway.com/products/coil-cleaning-systems-chemicals/coil-cleaning-machines/coilpro-jr-compact-coil-cleaning-system#.VTFjWWd0ypo USA.

* cited by examiner

*Primary Examiner* — Shay Karls
(74) *Attorney, Agent, or Firm* — Gilbridge, Tusa, Last & Spellane, LLC; Todd S. Sharinn

(57) ABSTRACT

Apparatus for collecting waste cleaning fluid and debris resulting from a cleaning operation of a wall-mounted air handler assembly of a mini-split air conditioner. The apparatus is installed by placing and supporting a funnel-shaped collection bib under the air handler assembly by means of device-mounting brackets and a deflector plate inserted between the air handler assembly and the wall, the bib being held open by an arcuate rib attached to the mounting brackets and by a supporting cord passing through the rib, brackets, and bib hem and being cinched against the device.

19 Claims, 7 Drawing Sheets

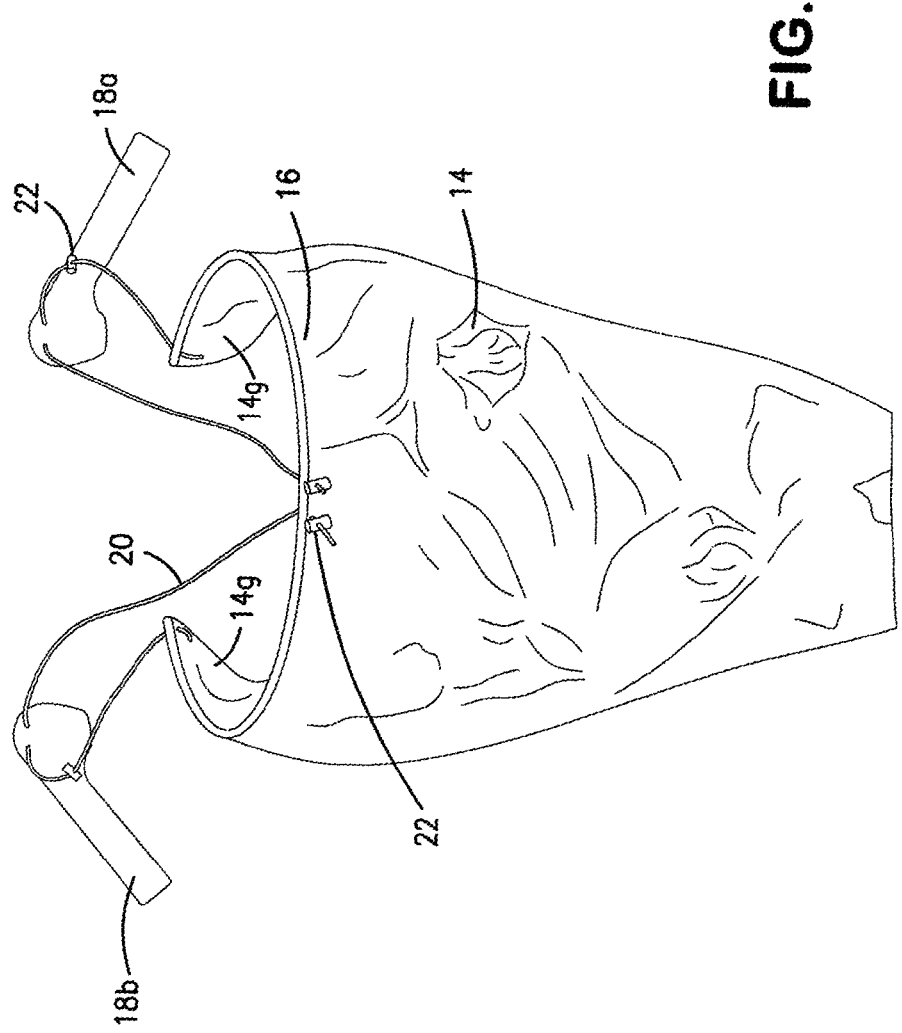

APPARATUS AND METHOD FOR COLLECTION AND DISPOSAL OF CLEANING WASTE-WATER AND DEBRIS FROM AIR CONDITIONERS

RELATIONSHIP TO OTHER APPLICATIONS AND PATENTS

This application is a Continuation-In-Part of pending U.S. patent application Ser. No. 13/999,444, filed Feb. 26, 2014, the entire contents of which are relied upon and are fully incorporated herein by reference.

BACKGROUND OF THE INVENTION

The present invention is directed to the art of cleaning the indoor heat exchangers of air conditioning units, and in particular to disposal of water and cleaner fluids used, and debris removed, in the course of cleaning the units. Air conditioning units with which the invention is used, known generally in the art as "mini-split" systems, typically provide heated or cooled air for a specific and limited interior living space such as a single room. Mini-split air conditioners typically produce 9,000 to 36,000 Btu (9,500-38,000 kJ) per hour of cooling.

An air conditioner system operates on the principle of adiabatic compression and rarefaction of a coolant medium, the principles of which were recognized and patented by Dr. John Gorrie in U.S. Pat. No. 8080, issued May 6, 1851. In a so-called "hot side" of the system, a pump compresses (and typically liquefies) an appropriate refrigerant adiabatically, which is then cooled to ambient temperature by being passed through a first heat exchanger and first fan disposed in a heat dump such as the outdoors. The ambient-tempered refrigerant is then adiabatically cooled (and typically evaporated) in a so-called "cold side" of the system disposed in the indoor space to be cooled by being passed through an expansion valve or orifice. The cooled refrigerant is passed through a second heat exchanger and fan, thereby cooling the indoor air. The refrigerant is thus warmed and is passed back to the compressor on the hot side, completing the cycle.

As used herein, the term "heat exchanger" should be taken to mean all the air-handling and refrigerant-conducting components of a heat exchanger system, including but not limited to tubing, coils, fins, fan blades, ducting, and the like.

In wall- or window-mounted air conditioners, the hot and cold sides typically are close-coupled, requiring a large opening for passage of air through the side of the building. A split-system air conditioner is so named because the hot side is "split" and remote from the cold side of the system. In a mini-split system, the cold side is typically disposed in an air handler assembly mounted on a wall in the space to be cooled. The hot side is mounted conventionally outside the building and is connected to the air handler assembly through insulated tubing for transmission of compressed and decompressed refrigerant as well as condensate from the cold side, requiring only minimal openings through the building wall.

As is known in the art, a mini-split system may also be provided with appropriate controls and valving and may be operated in a reverse mode wherein the outside compressor unit functions as a heat pump to abstract heat from the environment and transfer hot refrigerant to the inside air handler for heating room air being recirculated over the indoor heat exchanger.

To maintain thermodynamic heat-exchange efficiency in air conditioning units, it is necessary periodically to clean accumulated dust and debris from the heat exchanger in the cold side air handler assembly. Room air conditioning units of concern here typically are situated in, by way of example only, motels, hotels, residences, and offices, and may be in close proximity to residents, office workers, and valuable office furniture, computers, paperwork, and files, as well as finished flooring and walls; so extreme care and finesse are required in cleaning heat exchangers in these settings.

The present invention is directed to apparatus and method for easily and safely collecting spent cleaning fluids and debris from cleaned cold-side air handler assemblies in mini-split air conditioning units; for preventing damage to and contamination of nearby objects, walls, floors and persons during such cleaning operations; and for directing such fluids to a floor drain, sewer, or collection container for later disposal.

In the prior art, MacGyver Lab Pty Ltd, Melbourne, Australia, discloses the AIRCONcare™ Kit Wash Bag designed to attach to an air conditioning unit with a strong elastic band. A significant shortcoming of this system is the lack of any component to assist in keeping the mouth of the wash bag open to assure easy and complete reception of all fluids during cleaning of the heat exchanger. Further, the bag has no outlet so all fluids must be captured and the volume of fluids is limited by the volume of the bag. Further, the weight of the captive fluids must be borne by the air conditioning unit and the operator, typically with only one hand while manipulating a spray wand with the other hand. Further, cleaning of air conditioning units mounted relatively high on a wall is impractical and cumbersome, not to mention dangerous for risk of spillage of the collected fluids and debris upon removal and emptying of the bag.

Further in the prior art, SDLM Pty Ltd, Australia, discloses the Aqua QB system for cleaning mini-split air handler assemblies. The system comprises a plastic bag suspended by two sets of straps that cooperate to secure the bag to the air handler assembly. The bag includes a drain port.

Significant shortcomings of this system are that it relies on cooperating straps that are cumbersome and may require more than one technician to install and maintain the system on an air handler assembly. Because the straps are not fixed to the air handler assembly or the supporting wall in any manner, the cooperating straps require the users to monitor and adjust the straps to rebalance the apparatus to prevent slippage and failure of the apparatus during the cleaning process. Further, the system is disposed solely below the bottom of an air handler assembly and thus affords limited or no protection of the floor, wall, or furnishings against lateral splashing or spray from fluids and debris exiting the air handler assembly. Still further, the system has no wall brackets or other shielding to protect the supporting wall against fluids and debris deflected peripherally. Still further, the drain port lacks a lightweight integral drain hose, and a conventional hose is a relatively heavy addition to an already cumbersome apparatus.

Further in the prior art, HydroKleen Australia Pty Ltd discloses a cleaning system similar to the Aqua QB system for cleaning mini-split air handler assemblies. The system comprises a plastic bag suspended by two sets of straps that cooperate to secure the bag to the air handler assembly. The shortcomings of this system are the same as those for the Aqua QB system described above.

U.S. Pat. No. 6,863,116 B, issued Mar. 8, 2005 to Kane et al. ("the '116 Patent") discloses an apparatus for collection and disposal of waste-water and debris in an operation for cleaning heat exchanger tubes. The inventions of the '116 Patent comprise a bib in the general shape of a funnel with large open end for receiving waste-water and debris from the air handler assembly, with conical body converging to a small end terminating in an elongate duct for leading the waste water and debris to a drain; a support frame for receiving and maintaining the large end of the bib in open position, the support frame having a plate for positioning the bib; and a plurality of mounting arms projecting from the plate for insertion into the air handler assembly, permitting placement of the bib as desired to collect effluent during a cleaning operation.

The present invention provides a structurally superior solution for the safe and effective collection and disposal of waste-water and debris in an operation for cleaning the air handler heat exchanger in a mini-split air conditioning unit. By way of example only, the bib subassembly provides improved integrity, protection against accidental spillage and support of the assembly once mounted, as well as simplified assembly and use. The present invention introduces a subassembly including an adjustable cord cooperating with brackets disposable behind the sides of the air handler assembly to be cleaned, thus eliminating the need for manipulating a plurality of tubular cleaning brushes or straps. Further, the present invention's deflector plate or plates and brackets provide the added benefits of, in addition to easier assembly, disassembly, use, and stability, protection of the supporting wall upon which the unit is mounted against damage caused by peripheral deflection or splashing of fluids and debris.

SUMMARY OF THE INVENTION

In accordance with the apparatus and method of the present invention, water and cleaning fluid from a wall-mounted air handling assembly are collected in a large flexible plastic bib which is conical or funnel shaped and preferably includes an integral lightweight drain portion, having its large open end positioned adjacent and below the assembly and its small open end and integral drain portion positioned to direct water and fluid toward a floor drain or to collection in a container such as a five-gallon bucket or the like.

In a currently preferred arrangement of the invention, a shield is placed over the control panel of the air handler assembly and the outer cover is removed, providing access to the elements to be cleaned. The bib is held open by an arcuate rib removably and pivotably attached to side brackets inserted behind the A/C unit. A deflector plate or plates is also inserted behind and below the bottom of the A/C unit. A supporting cord, preferably elastic such as shock cord, is fitted with cord clamps to maintain the wide open bib in front of and under the A/C unit to catch and dispose of cleaning water and fluid draining from the heat exchanger in a cleaning operation. The side brackets slide into the space between an air handler assembly casing and the wall supporting the unit. The open collection bib is positioned centrally of the heat exchanger being cleaned and the bib is cinched up and under the casing along the joint between the deflector plate or plates and wall so as to place the bib under the entire air handler assembly. When so positioned, the collection bib catches water and cleaning fluid exiting from the air handler assembly and drains the water and fluid to a suitable receptacle such as a floor drain adjacent the air handler assembly or a portable bucket.

The installed apparatus is stable and requires no supportive or other assistance from a user. The flexible and elastic cord permits the arcuate rib and front of the bib to be depressed with an operator's hand while manipulating a spray cleaning apparatus with the other hand. This is particularly useful in cleaning the air handler assembly's blower wheel (also referred to herein as a "fan") which tends to accumulate large and compressed amounts of dust and biological growth. Cleaning the blower wheel adequately is a very important component of the cleaning operation, which is not easily accomplished by prior art apparatus which to not afford of easy and controlled lowering of the front of a bib.

Preferred spray cleaning apparatus is low pressure/low water flow pressure washer with ability to spray a chemical cleaner with subsequent rinse along with attachments which allow spray to precisely reach in and around sensitive areas of the mini-split unit. Exemplary spray cleaning apparatus especially adapted for use with the present invention are the SpeedClean CJ-125 CoilJet Portable HVAC Coil Cleaning System, and any of various models of Goodway Technologies' CoilPro coil cleaning systems.

In this way the air handler assembly is cleaned and the cleaning water fluid is disposed of in an efficient and tidy manner without soiling or damaging nearby room objects, and without the need to move the air handler assembly or objects from their usual places.

Specific examples are included in the following description for purposes of clarity, but those of ordinary skill in the art may find that various details may be changed within the scope of the present invention.

BRIEF DESCRIPTION OF THE DRAWINGS

A preferred embodiment of the invention has been chosen for detailed description to enable those having ordinary skill in the art to which the invention pertains to readily understand how to construct and use the invention as shown in the accompanying drawings wherein:

FIG. 7 is an assembly view of apparatus of the invention including bib, rib, side brackets, and supporting cord with cord locks.

DETAILED DESCRIPTION OF THE PREFERRED EMBODIMENT

Referring now to FIGS. 1 through 8, the apparatus and method of the invention have particular application to cleaning of a mini-split air handler assembly 10 mounted on a wall W in a residence or an office leaving a space S between air handler assembly 10 and wall W along opposite rear side edges 10a-b and bottom edge L of the air handler assembly.

Figure 1:
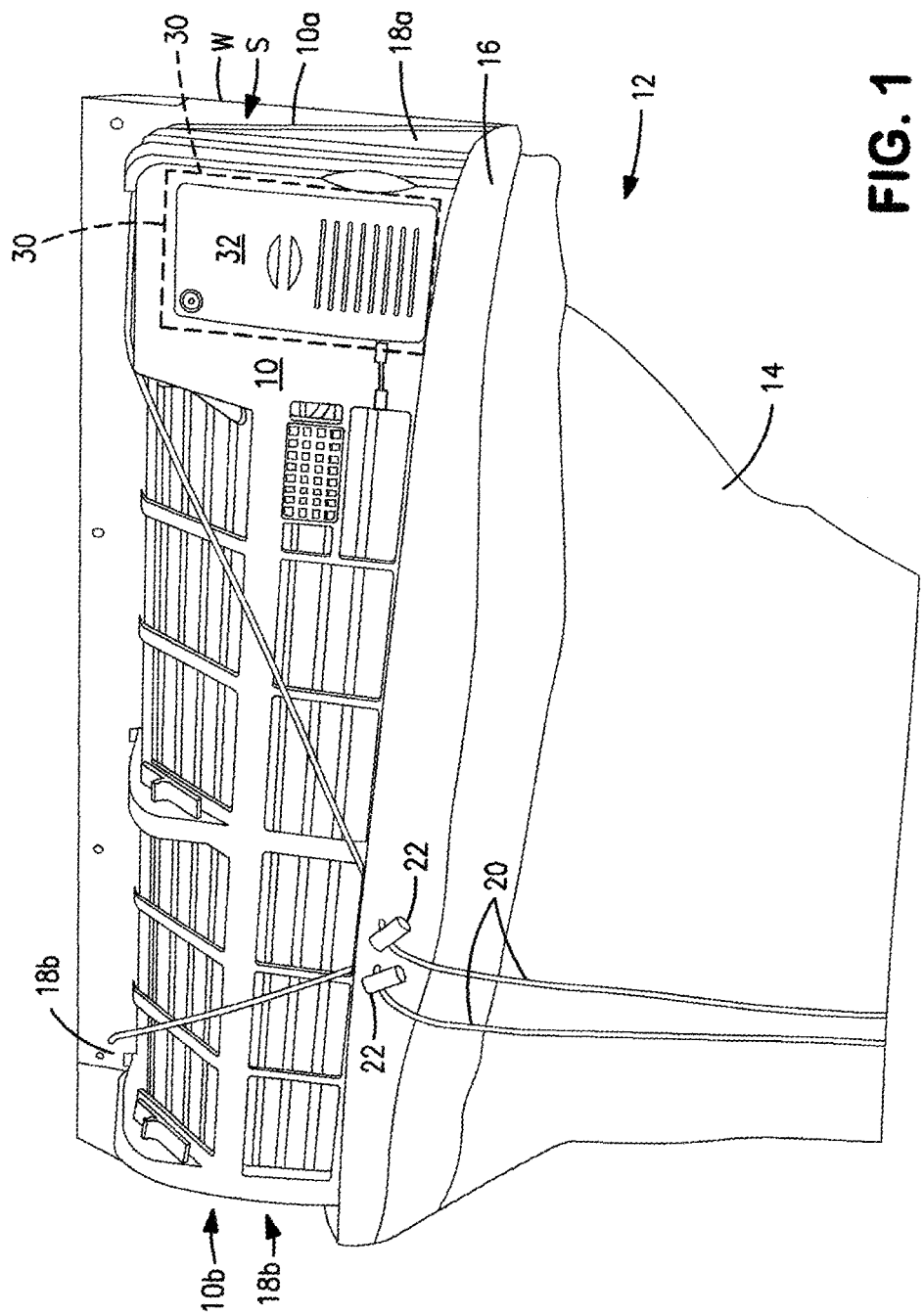
FIG. 1 is a front corner elevation view showing a device of the present invention including a funnel shape open-end collecting bib with a wide opening and a supporting rib positioned through a hem formed around the opening, side mount brackets, and an adjustable cord for supporting the device on a mini-split air handler assembly.
Figure 2:
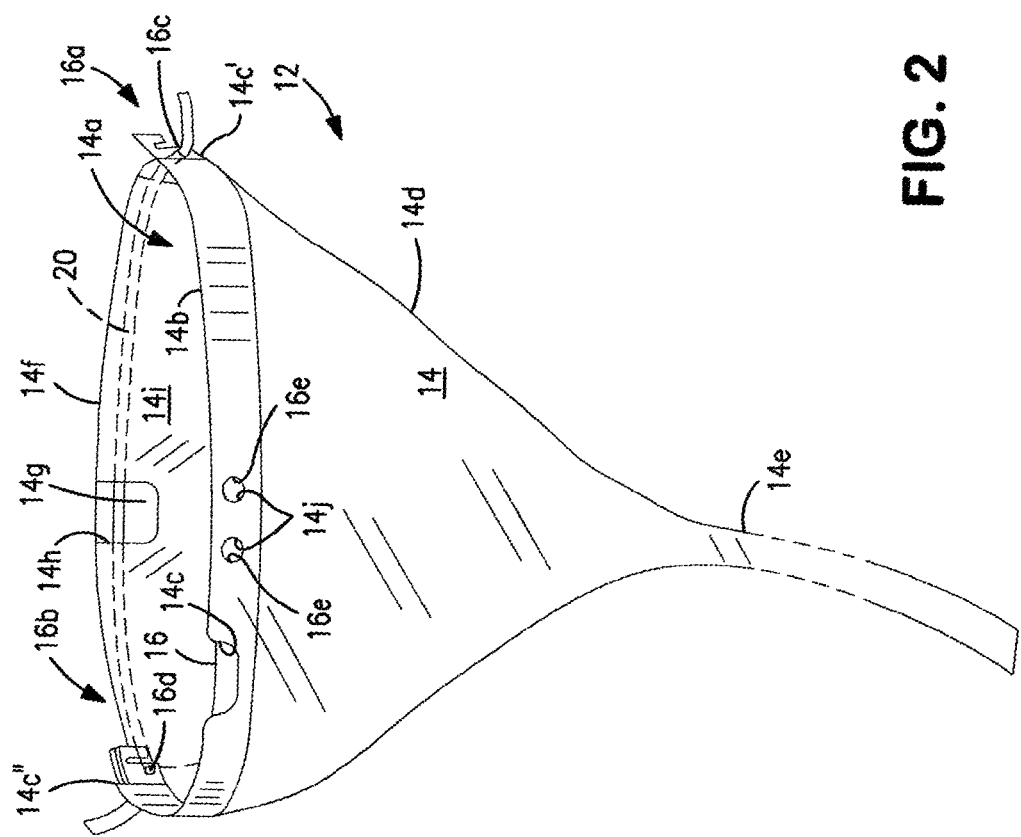
FIG. 2 is a perspective view of a collection bib and supporting rib ready to be placed in position on an air handler assembly for collecting cleaning fluid and debris during heat exchanger cleaning.

Mini-split air handler assemblies have a determinable range of width, height, and depth as can be judged from the installed unit shown in FIG. 1 of the drawing. The apparatus of the invention is adjustable in its design and construction to accommodate mini-split units sized in such determinable range, e.g., 30 to 44 inches wide, or the like.

Referring to FIGS. 1-4, a device 12 for collection and disposal of waste cleaning fluid and debris from an air handler assembly 10 comprises generally apparatus including a collection bag or bib 14; an arcuate rib 16 for holding the bib open and mounting it in operating position; a pair of mounting brackets 18a-b held in the space S on left and right sides of air handler assembly 10 between air handler assembly 10 and supporting wall W and receivable of the ends of rib 16; at least one deflector plate D insertable along line L between air handler assembly 10 and wall W on the bottom side of the air handler assembly, and sized and shaped to accommodate a variety of air handler assemblies; and a supporting and retaining cord 20, preferably elastic, with cord clamps 22 for holding bib and rib in position while the heat exchanger (not shown) of air handler assembly 10 is cleaned.

The collection means comprises a large flexible impermeable plastic bib 14 in the general shape of a funnel with large entry opening 14a with marginal hem 14b to define a rib 16 receiving passage 14c, and a conical body 14d converging into an integral elongated duct 14e leading waste fluid and debris to a drain line or collection container such as a five gallon bucket or the like. The bib opening is hemmed 14b over a front arcuate portion of the opening to define a rib receiving passage 14c open at each end 14c', 14c". A rib 16 inserted into passage 14c projects through each open end to expose rib end hooks 16a-b, and cord apertures 16c-d, seen best in FIG. 5.

The bib opening 14a includes a back margin 14f extending between hem openings 14c', 14c", the back margin being defined by a flap 14g of bib 14 folded at the margin to define an elongate inside recess 14h within back bib face 14i and back flap 14g. The elongate recess accommodates a portion of supporting cord 20 extending between rib end apertures 16c-d for the purpose of positioning and holding the bib back margin 14f up and under an A/C unit along a line L (FIG. 3) and behind one or more deflector plates D inserted where the unit underside 10c meets supporting wall W.

The rib 16 is a slat preferably made of plastic that may be preformed, or may be flexible to form an opening mouth of bib opening 14a to accommodate different mini-split air handler assemblies having different widths. Arcuate rib 16 is an elongated strip having ends terminating in a hook 16a-b and having a cord aperture 16c-d. In one preferred embodiment, the rib passes through bib hem 14b for spreading the open end of the bib beneath the coils of an air handler assembly. It is understood that bib 14 and rib 16 be removably or permanently coupled using multiple known means including, but not limited to, snaps, buttons, Velcro, hooks, glue or fusion of the materials. The rib and hem have a pair of aligned central apertures 16e, 14j respectively, midway between the hooked ends with each aperture for receiving an end of supporting cord 20.

Figure 5:
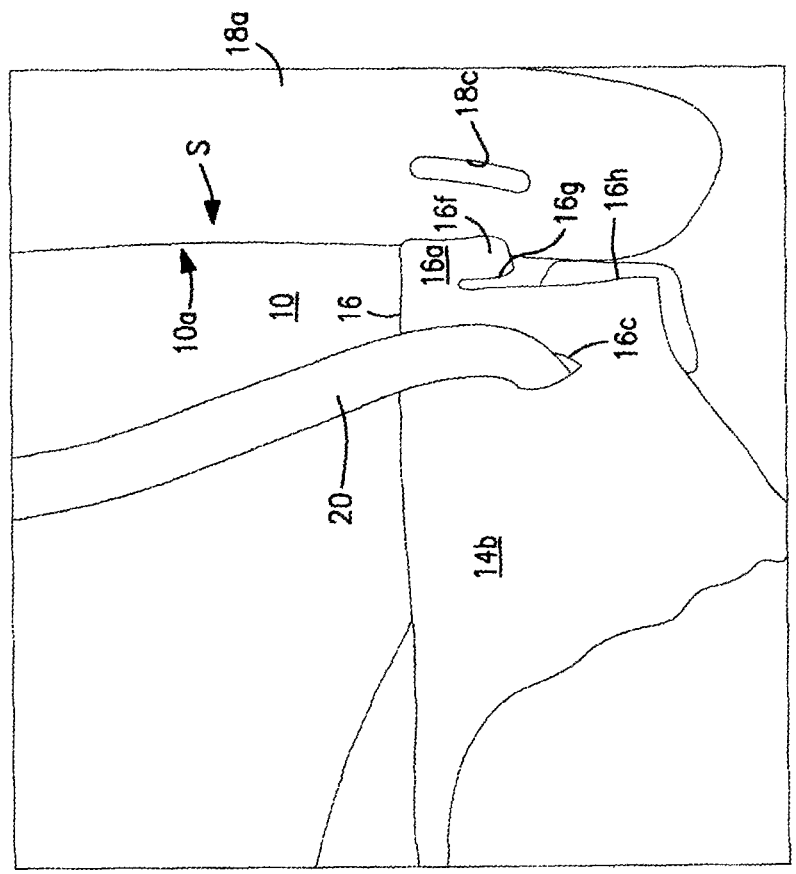
FIG. 5 is a back corner elevation of an air handler assembly showing a bib supporting rib end being moved into position in a receptor slit in the lower portion of side mount bracket.

As seen best in FIG. 5, each end of rib 16 has an opening 16c-d for passing the supporting cord and an end hook 16a-b defined by tab 16f and adjacent slot 16g in rib end edge 16h-i. Tab 16f fits through a slit 18c in a side bracket 18a-b and the rib end is moved so that rib slot 16g firmly engages slit 18c in side bracket wall. When each rib end hook is secured in a side bracket slit, the rib passes through the bib hem in desired arc across the front of the A/C unit holding the bib in wide open position.

Figure 4:
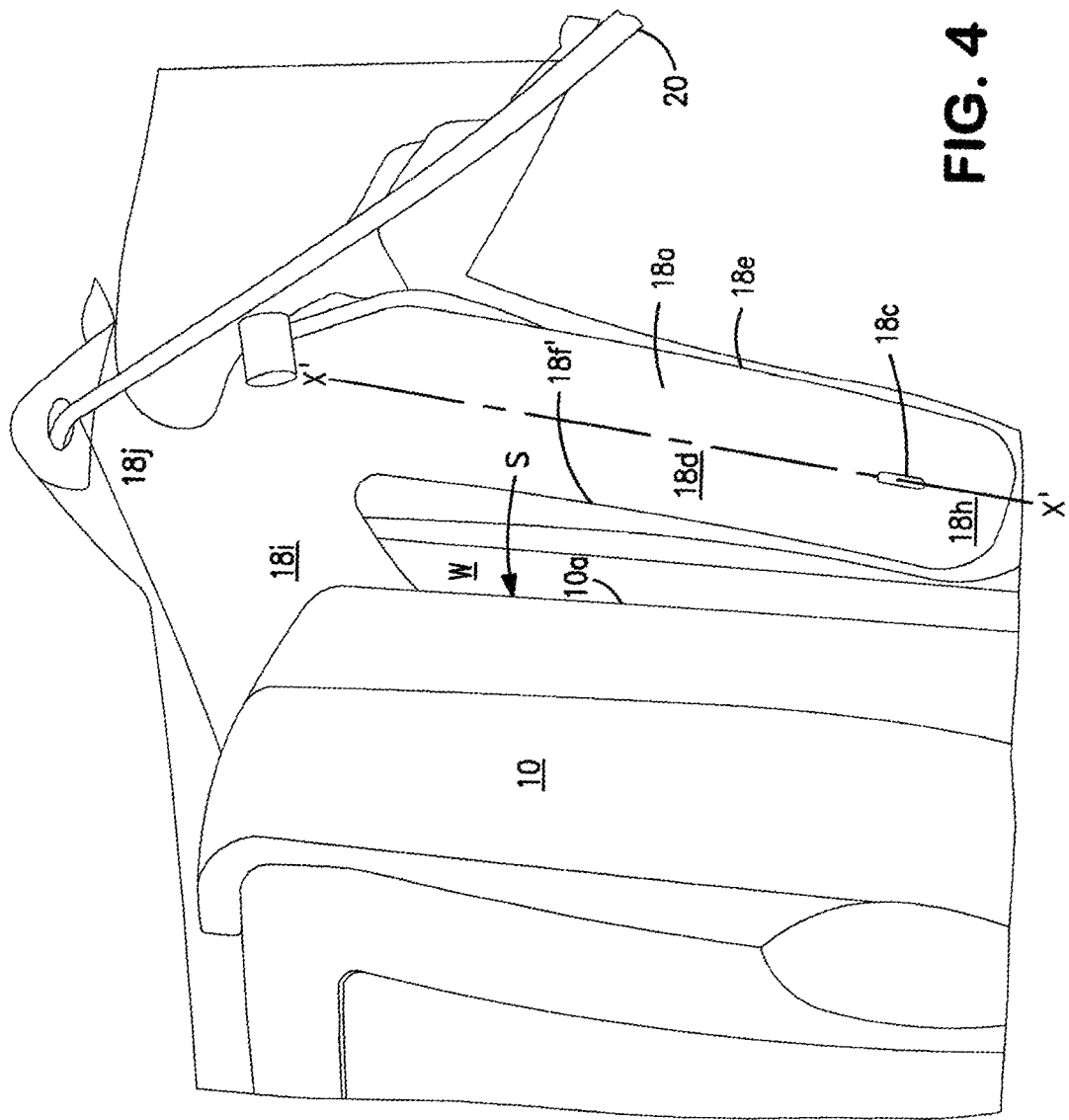
FIG. 4 is a front corner elevation of an air handler assembly showing a side mount bracket being moved into position between the air handler assembly and its supporting wall.
Figure 6:
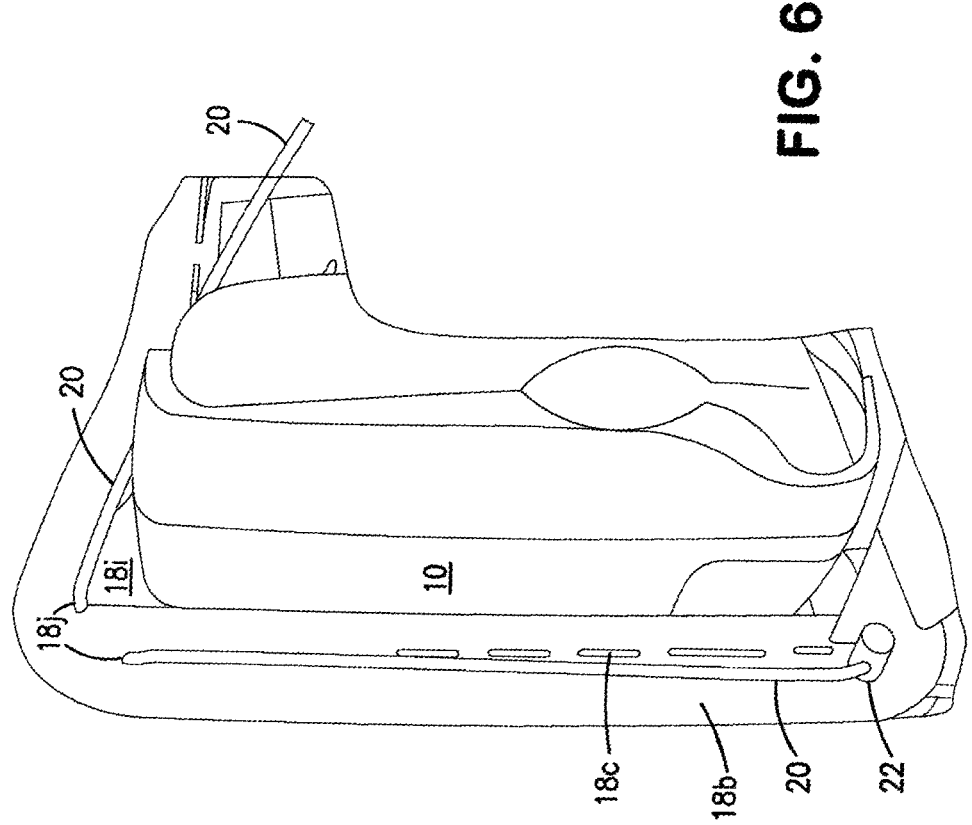
FIG. 6 is a back corner elevation of an air handler assembly showing mounting bracket in position and threaded with supporting cord.

Side mount brackets 18a-b shown in FIGS. 4-6 are slipped into position in an existing space S between an air handler assembly 10 and the unit's supporting wall W. A side mounting bracket 18a-b comprises an elongate plate 18d having an axis x-x', side edges 18e-f, first and second ends 18g-h spaced from each other along the axis, at least a single integral flange 18i extending from a side edge at one end of the plate, and a crown 18j joined to flange and plate at the one end of the plate. Bracket plate 18d has at least one and preferably a plurality of rib hook receiving slits 18c. Bracket crown 18j has at least one and preferably two openings 18j' for passing supporting cord 20.

Figure 8:
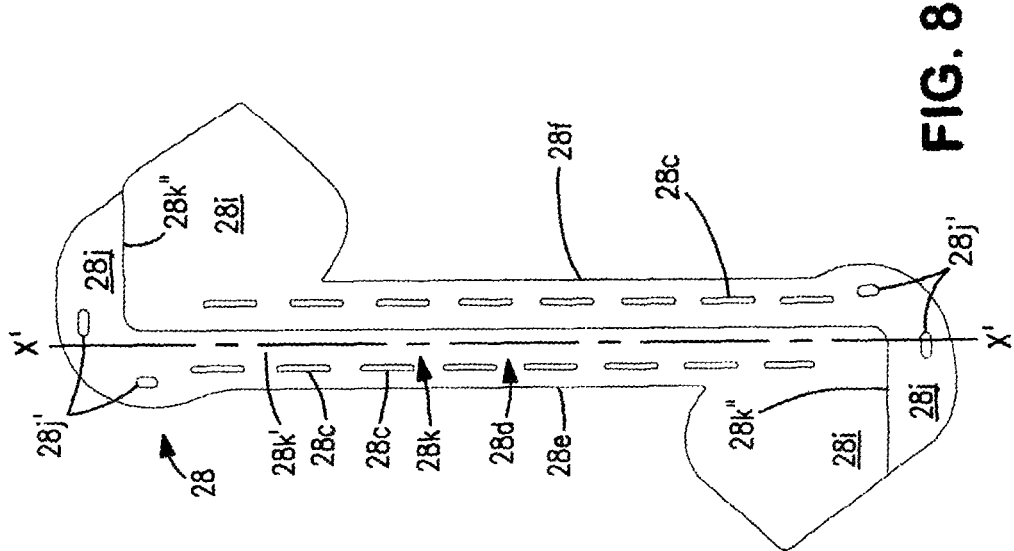
FIG. 8 is a modified embodiment of mounting bracket according to the invention.

In preferred embodiment shown in FIG. 8, a side mount bracket 28 comprises an elongate plate 28d having an axis x-x', side edges 28e-f, first and second ends 28g-h spaced from each other along the axis, an integral flange 28i and crown 28j at both ends extending in opposed directions from the axis, and a Z-shaped ridge 28k including central ridge 28k' along the axis and right angle ridges 28k" at both ends separating flange and crown. Two rows of slits 28c extend axially of the plate on either side of central ridge, and the crown dual cord passing apertures 28j'. The preferred embodiment of FIG. 8 comprises a single side bracket configuration that can be used on both the left and right sides 10a-b of an air handler assembly by simple rotation 180°. The Z-shape ridge serves as a stop for limiting movement of the bracket into space S between air handler assembly 10 and supporting wall W so that the bracket exposes slits and openings and provides a necessary base for securing supporting cord 20.

In addition to providing anchorage for supporting cord 20, in one embodiment brackets 18a-b or brackets 28 also may extend laterally along the wall in any desired shape or size to provide additional protection for the supporting wall against deflection, splashing, and damage by fluids and debris.

Figure 3:
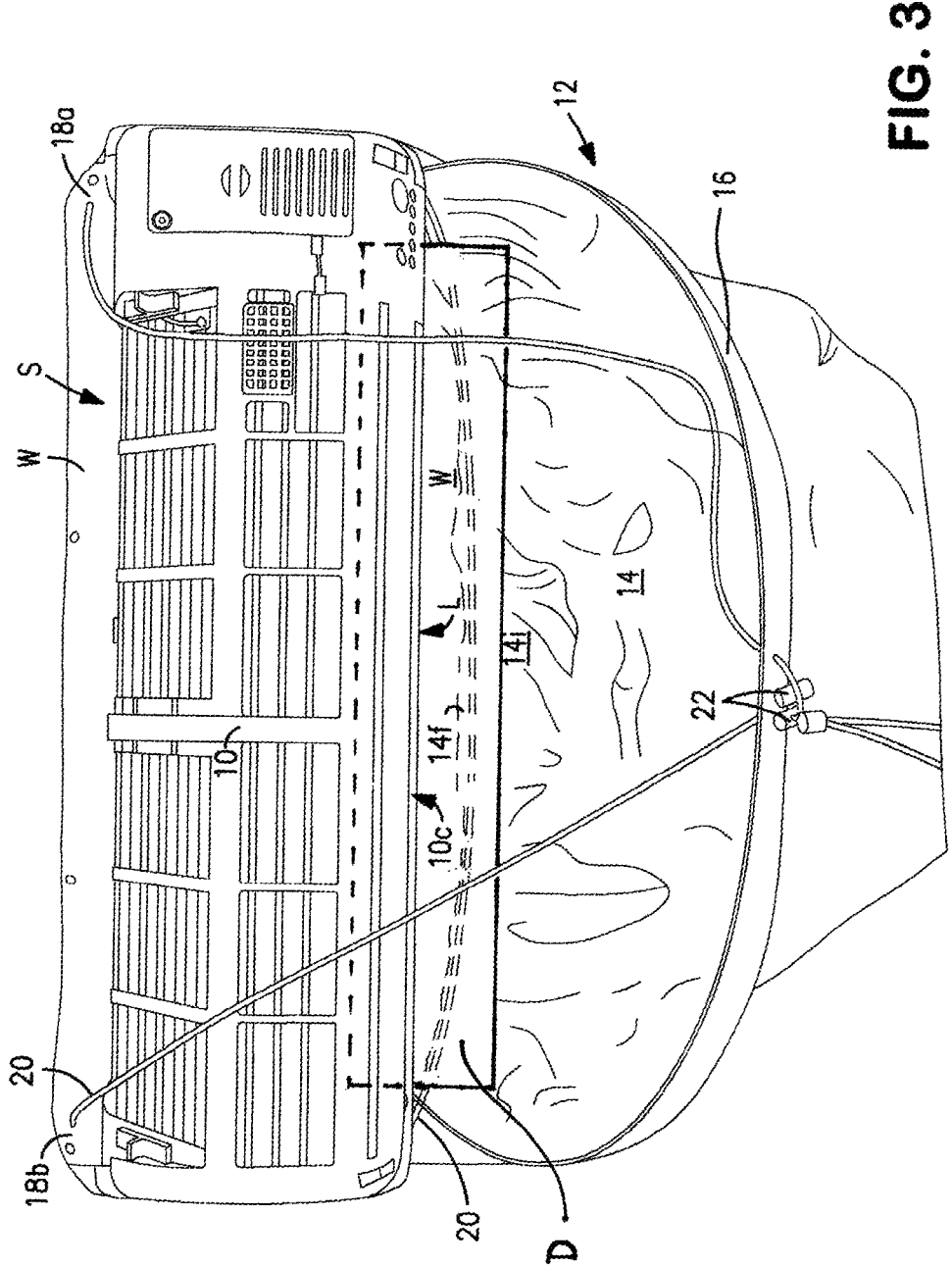
FIG. 3 is a front elevation of the device of FIG. 1 being moved into position on an air handler assembly, and the cord for holding the device in preliminary position behind a deflector plate.

Supporting and retaining cord 20 as shown in FIGS. 3 and 7 passes through one rib center aperture 16e, through one or both apertures in first mounting bracket 18a, through first rib end aperture 16c, through the recess 14h formed by back flap 14g of the bib, through second rib end aperture 16d, through one or both apertures in second mounting bracket 18b, and through the other rib center aperture 16e. Supporting cord 20 is drawn taut, with inside flap margin of the bib fetched up under at least one deflector plate D disposed in the air handler assembly joint with the supporting wall W, as best seen in FIG. 3, the rib end hooks 16f engaged in bracket slits 18c, the rib brought to a generally horizontal position, and cord clamps 22 applied on cord 20 at each rib end opening and each rib central opening to hold device 12 firmly to A/C unit for heat exchanger cleaning.

It will be observed that supporting cord 20 as it passes through rib end apertures 16c and 16d acts as a hem retainer wherein the rib end hooks 16f are normally exposed and ready for insertion into side bracket slits 18c.

It is an important advantage of the present invention that, because the supporting cord is elastic, i.e., shock cord, and the rib is pivotably attached to the side brackets, the front of the bib and rib may be pivoted downward controllably and as desired to provide operator access to components such as the blower wheel in the underside of the air handier assembly In a further preferred embodiment, the flexible rib and bib are foldable to fit within a conventional storage and shipping container, e.g., a standard 5-gallon pail with lid. Preferably, the brackets, at least one deflector plate, and supporting cord are also sized to fit within such a container. A 5-gallon pail is doubly useful as a receptacle for waste water and debris captured by the bib.

In a still further preferred embodiment, the elongated duct 14e, of bib 14, leading waste fluid and debris to a drain line or collection container, cooperates with a tube or hose to provide a means for removing the waste fluids and debris to a more distant receptacle. It is envisioned that the elongated duct 14e will rely upon known receptacles for linking to a hose or tube such as friction or male/female clamping or threaded fittings. In addition to such fittings and cooperating means, the elongated duct 14e preferably includes means for arresting the flow of fluids and debris, such as a clamp, spigot, or valve in the event of a receptacle's over-flow or clogging or the user's need to empty the storage and shipping container. Preferably, integral elongated duct 14e is at least about 8 feet long, permitting use of the present invention with air handling systems installed above doors or windows by up to 12 feet.

In practice, the device is prepared by assembling the rib in the bib hem, threading the supporting cord through one rib central aperture, one bracket crown aperture, one rib end aperture, the bib inner flap recess, through the other rib end aperture, the other bracket crown aperture, and the other rib central aperture, the rib ends being hooked onto the bracket slits, the cord being drawn tight to secure the bib in place with its horizontal opening level with the bottom of the air handler assembly, and the cord clamps cinched up to the rib to hold the device stationary while heat exchanger cleaning proceeds.

A suitable supporting cord 20 is an elastic cord popularly known as a bungee cord. Cord clamps 22 are also well-known and slide along the cord to a desired position where they are released.

A preferred method in accordance with the present invention comprises the steps of a) placing an impermeable protective cover 30 on an air handler assembly operating control panel 32; b) inserting left and right side brackets 28 between the air handler assembly side edges and the supporting wall W; c) inserting at least one deflector plate D between the bottom of the air handler assembly and the supporting wall W; d) opening a funnel shape collection bib 14 with an arcuate rib 16; deploying the open bib by connecting the rib to each side bracket; f); passing the supporting cord through the front of the rib and bib, one side bracket, one end of the rib, through the bib underneath the air handler assembly, through the other rib end, through the other side bracket, and through the front of the rib and bib; h) sliding the bib recess h containing cord 20 upward along line L between wall W and deflector plate or plates D; i) drawing the cord tight to support the bib in position below the air handler assembly; and j) clamping the cord 20 to the rib center and rib ends to hold the cord tight.

Various changes may be made to the structure embodying the principles of the invention. The foregoing embodiments are set forth in an illustrative and not in a limiting sense. The scope of the invention is defined by the claims appended hereto.

What is claimed is:

1. An apparatus for collecting waste fluid and debris resulting from cleaning of an air conditioning air handler assembly mounted on a supporting wall, comprising:
a) a collection bib having an open first end positionable adjacent said air handler assembly for collecting said waste fluid and debris;
b) a rib cooperating with said collection bib at said first end to shape said first end for said collecting;
c) a first side bracket disposable between said air handler assembly and said wall along a first side of said air handler assembly and having portions extending vertically both above and below said first side;
d) at least one deflector plate disposable between said air handler assembly and said wall; and
e) a first support element disposed between said rib and said portion of said first side bracket extending vertically above said first side of said air handling assembly to position said bib and said rib for said collecting.

2. An apparatus in accordance with claim 1 wherein said collection bib further comprises an open second end for discharging said collected waste fluid and debris.

3. An apparatus in accordance with claim 2 wherein said open second end further comprises means for stopping flow of liquid through said open second end.

4. An apparatus in accordance with claim 1 wherein said discharged and collected waste fluid and debris are directed by said second end of said bib to means for the safe collection and removal of fluid and debris from the work site selected from the group consisting of receptacle connected or cooperating with existing drain, reusable bucket, and disposable container.

5. An apparatus in accordance with claim 4 wherein said reusable bucket is sized for the easy storage and transportation of each of the claimed components of the apparatus by a single user to and from the work site.

6. An apparatus in accordance with claim 1 wherein said second end of said bib for discharging said collected waste fluid and debris cooperates with a tube or hose for the safe removal of fluid and debris from the work site.

7. An apparatus in accordance with claim 1 wherein said second end of said bib for discharging said collected waste fluid and debris cooperates with a means for arresting the flow of fluids and debris.

8. An apparatus in accordance with claim 1 wherein said rib is flexible.

9. An apparatus in accordance with claim 8 wherein said flexible rib is compressible for easy storage and transportation to and from the worksite.

10. An apparatus in accordance with claim 1 wherein said rib is fixedly attached to said collection bib.

11. An apparatus in accordance with claim 1 wherein said rib is removably attached to said collection bib.

12. An apparatus in accordance with claim 1 wherein said rib is disposed in a hem formed along said open first end.

13. An apparatus in accordance with claim 1 comprising said first and at least a second of said side brackets disposable between said air handler assembly and said wall along respective of first and second sides of said air handler assembly and having portions extending vertically both above and below said first and second sides.

14. An apparatus in accordance with claim 13 wherein said first and second side brackets are sized and shaped to provide added peripheral protection to said supporting wall from fluids and debris.

15. An apparatus in accordance with claim 1 wherein said first and second side brackets are sized and shaped for easy storage and transportation to and from the worksite.

16. An apparatus in accordance with claim 1 wherein said support element is a flexible, elastic cord.

17. An apparatus in accordance with claim 1 further comprising at least one cord clamp disposed on said support element for limiting the operating length thereof.

18. An apparatus for collecting waste fluid and debris from the cleaning of an air conditioning air handler assembly mounted on a supporting wall, comprising:
a) a collection bib having an open first end positionable adjacent and below said air conditioning air handler assembly for collecting said waste fluid and debris therefrom, and having an open second end for discharging said collected waste fluid and debris, and having a hemmed portion of said open first end extending partially around said open first end, and having a back flap forming a recess in a non-hemmed portion of said open first end;

b) a flexible rib having first and second ends disposed through said hem to shape said first end for said collecting, said rib having first and second center apertures and first and second end apertures and first and second hooks formed at said first and second ends;

c) a first side bracket disposable between said air handler assembly and said wall along a first side of said air handler assembly and having portions extending vertically above and below said first side, and having at least one aperture, and having at least one slit formed therein for receiving said first rib end hook;

d) a second side bracket disposable between said air handler assembly and said wall along a second side of said air handler assembly and having portions extending vertically above and below said second side, and having at least one aperture, and having at least one slit formed therein for receiving said second rib end hook;

e) at least one deflector plate disposable between said air handler assembly and said wall along the bottom of said air handler assembly;

f) a flexible cord passing through one of said rib center apertures, through said at least one aperture in said first side bracket, through said first rib end aperture, through said recess, through said second rib end aperture, through said at least one aperture in said second side bracket, and through the other of said rib center apertures; and g) at least one cord clamp disposed on said flexible cord adjacent said one of said first and second rib center apertures.

19. A method for collecting waste fluid and debris from the cleaning of an air conditioning air handler assembly mounted on a supporting wall, comprising the steps of:

a) placing an impermeable protective cover on an operating control panel of said air handler assembly;

b) inserting first and second side brackets between said air handler assembly side edges and said supporting wall, wherein each of said first and second side brackets includes respective portions extending both above and below said air handler assembly;

c) inserting a deflector plate between the bottom of said air handler assembly and said supporting wall;

c) opening a funnel shape collection bib with an arcuate rib;

d) deploying said open bib by connecting said rib to each of said first and second side brackets;

e) passing a supporting cord through the front of said rib and bib, through one of said first and second side brackets, through one end of said rib, through a bib recess underneath said air handler assembly, through the other end of said rib, through the other of said first and second side brackets, and through the front of said rib and said bib;

f) sliding said bib recess containing said cord upward between said wall and said deflector plate;

g) drawing said supporting cord tight to support said bib in position below said air handler assembly; and h) clamping said supporting cord at said rib center and said rib ends to hold said supporting cord tight.

\* \* \* \* \*